United States Patent
Schober et al.

(10) Patent No.: US 11,606,813 B2
(45) Date of Patent: Mar. 14, 2023

(54) PHYSICAL DOWNLINK CONTROL CHANNEL DESIGN

(71) Applicant: Nokia Technologies Oy, Espoo (FI)

(72) Inventors: Karol Schober, Helsinki (FI); Kari Hooli, Oulu (FI); Esa Tiirola, Kempele (FI); Timo Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 204 days.

(21) Appl. No.: 16/771,757

(22) PCT Filed: Jan. 2, 2020

(86) PCT No.: PCT/FI2020/050002
§ 371 (c)(1),
(2) Date: Jun. 11, 2020

(87) PCT Pub. No.: WO2020/144401
PCT Pub. Date: Jul. 16, 2020

(65) Prior Publication Data
US 2021/0076418 A1    Mar. 11, 2021

Related U.S. Application Data

(60) Provisional application No. 62/790,825, filed on Jan. 10, 2019.

(51) Int. Cl.
*H04W 4/00* (2018.01)
*H04W 74/08* (2009.01)
(Continued)

(52) U.S. Cl.
CPC ..... *H04W 74/0808* (2013.01); *H04W 72/042* (2013.01); *H04W 72/0446* (2013.01); *H04W 76/11* (2018.02)

(58) Field of Classification Search
CPC ............ H04W 74/0808; H04W 76/11; H04W 72/042; H04W 72/0446
See application file for complete search history.

(56) References Cited

U.S. PATENT DOCUMENTS

2017/0339588 A1\* 11/2017 Moon .................. H04W 76/27
2018/0279304 A1    9/2018 Lee et al.
(Continued)

FOREIGN PATENT DOCUMENTS

CN    109156014 A     1/2019
EP      3749029 A1    12/2020
(Continued)

OTHER PUBLICATIONS

Office action received for corresponding Japanese Patent Application No. 2020-546124, dated Sep. 29, 2021, 4 pages of office action and 4 pages of translation available.

(Continued)

*Primary Examiner* — Siren Wei
(74) *Attorney, Agent, or Firm* — Squire Patton Boggs (US) LLP

(57) ABSTRACT

According to an aspect of the present disclosure, a method includes transmitting, by a network entity, at least one downlink control signal to a user equipment. The downlink control signal comprises a current slot format indicator and a further indicator. The current slot format indicator indicates at least one slot format combination. The further indicator comprises one or more of: at least one offset, at least one applicability indication, at least one next slot format indicator, and at least one indication of at least one channel occupancy time ending.

20 Claims, 11 Drawing Sheets

(51) Int. Cl.
*H04W 76/11* (2018.01)
*H04W 72/04* (2023.01)
*H04W 72/0446* (2023.01)

(56) References Cited

U.S. PATENT DOCUMENTS

| | | | | |
|---|---|---|---|---|
| 2018/0309513 | A1* | 10/2018 | Kim | H04B 7/2643 |
| 2019/0335500 | A1* | 10/2019 | Zhang | H04W 16/14 |
| 2020/0053728 | A1* | 2/2020 | Huang | H04L 27/26025 |
| 2020/0260442 | A1* | 8/2020 | Yi | H04L 5/001 |
| 2020/0322932 | A1* | 10/2020 | Kim | H04W 72/042 |
| 2022/0022248 | A1* | 1/2022 | Kwak | H04W 74/0808 |

FOREIGN PATENT DOCUMENTS

| | | |
|---|---|---|
| JP | 2019-50570 A | 3/2019 |
| JP | 2021-516484 A | 7/2021 |
| WO | 2016/187954 A1 | 12/2016 |
| WO | 2018/145019 A1 | 8/2018 |
| WO | 2018/231621 A1 | 12/2018 |

OTHER PUBLICATIONS

"On DL signals and channels", 3GPP TSG RAN WG1 Meeting AH-1901, R1-1900348, Agenda : 7.2.2.1.2, Nokia, Jan. 21-25, 2019, 14 pages.

Extended European Search Report received for corresponding European Patent Application No. 20739025.3, dated Oct. 8, 2021, 11 pages.

"Revised SID on NR-based Access to Unlicensed Spectrum", 3GPP TSG RAN Meeting #80, RP-181339, Agenda : 9.4.3, Qualcomm Incorporated, Jun. 11-14, 2018, 5 pages.

"3rd Generation Partnership Project; Technical Specification Group Radio Access Network; Study on NR-based Access to Unlicensed Spectrum; (Release 16)", 3GPP TR 38.889, V1.0.0, Nov. 2018, pp. 1-120.

"3rd Generation Partnership Project; Technical Specification Group Radio Access Network; NR; Physical layer procedures for control (Release 15)", 3GPP TS 38.213, V15.3.0, Sep. 2018, pp. 1-101.

"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.

"5 GHz RLAN; Harmonised Standard covering the essential requirements of article 3.2 of Directive 2014/53/EU", ETSI EN 301 893, V2.1.1, May 2017, pp. 1-122.

International Search Report and Written Opinion received for corresponding Patent Cooperation Treaty Application No. PCT/FI2020/050002, dated Mar. 24, 2020, 16 pages.

"On DL Signals and Channels for NR-U", 3GPP TSG RAN WG1 Meeting #95, R1-1812696, Agenda : 7.2.2.3.1, Nokia, Nov. 12-16, 2018, 21 pages.

Office action received for corresponding Indian Patent Application No. 202047033088, dated Nov. 15, 2021, 7 pages.

* cited by examiner

```
-- ASN1START
-- TAG-SLOTFORMATCOMBINATIONSPERCELL-START

SlotFormatCombinationsPerCell ::=   SEQUENCE {
    servingCellId                       ServCellIndex,
    subcarrierSpacing                   SubcarrierSpacing,
    subcarrierSpacing2                  SubcarrierSpacing                                                           OPTIONAL, -- Need R
    slotFormatCombinations              SEQUENCE (SIZE (1..maxNrofSlotFormatCombinationsPerSet)) OF SlotFormatCombination  OPTIONAL, -- Need M
    positionInDCI                       INTEGER(0..maxSFI-DCI-PayloadSize-1)                                        OPTIONAL, -- Need M
}

SlotFormatCombination ::=   SEQUENCE {
    slotFormatCombinationId             SlotFormatCombinationId,
    slotFormats                         SEQUENCE (SIZE (1..maxNrofSlotFormatsPerCombination)) OF INTEGER (0..255)
}

SlotFormatCombinationId ::=         INTEGER (0..maxNrofSlotFormatCombinationsPerSet-1)

-- TAG-SLOTFORMATCOMBINATIONSPERCELL-STOP
-- ASN1STOP
```

FIG. 1

| Format | \multicolumn{14}{c}{Symbol number in a slot} |
|--------|---|---|---|---|---|---|---|---|---|---|---|---|---|---|
|   | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |

FIG. 2

| DCI Format | Common PDCCH 1C with CC-RNTI | Explanation |
|---|---|---|
| Subframe configuration for LAA | 4 | Indicates the type of the current and the next DL SF (full DL or ending partial DL subframe) - based on Rel. 13 LAA |
| UL configuration for LAA | 5 | A pair of values to indicate UL offset and UL burst duration |
| PUSCH trigger B | 1 | indicates whether the UL grant is a triggered grant or not |
| Padding | 5 | bits reserved for future use (20 MHz) case to reach the size of Format 1C |
| SUM | 15 | |

FIG. 3

| RRC configured patterns | Slot index | | | | | | | | | |
|---|---|---|---|---|---|---|---|---|---|---|
| | 0 | 1 | 2 | 3 | 4 | 5 | 6 | 7 | 8 | 9 |
| pattern1 | DL | DL | DL | DL | DL | DL | DL/UL | UL | UL | UL |
| pattern2 | DL | DL | DL | DL | DL/UL | UL | UL | UL | UL | UL |
| pattern 3 | DL | DL | DL/UL | UL | UL | UL | UL | UL | UL | UL |
| pattern 4 | ... | | | | | | | | | |

| | | | | | | | | | | |
|---|---|---|---|---|---|---|---|---|---|---|
| desired pattern | DL | DL | DL | DL | DL/UL | UL | DL | DL | DL/UL | UL |
| SFI current | p2 | p2 | p2 | p2 | p2 | | p3 | p3 | p3 | |
| SFI next | p3 | p3 | p3 | p3 | p3 | | NA | NA | NA | |
| Offset | 0 | 1 | 2 | 3 | 4 | | 0 | 1 | 2 | |
| Applicability | 6 | 6 | 6 | 6 | 6 | | 4 | 4 | 4 | |

FIG. 7

PHYSICAL DOWNLINK CONTROL CHANNEL DESIGN

RELATED APPLICATION

This application was originally filed as PCT Application No. PCT/FI2020/050002 on Jan. 2, 2020, which claims priority from US application 62/790825, filed Jan. 10, 2019, each of which is incorporated herein by reference in its entirety.

TECHNICAL FIELD

Certain embodiments may relate to wireless communication systems. For example, some embodiments may relate to improved slot format indication.

BACKGROUND

Efficient new radio unlicensed (NR-U) operations may be supported through the use of slot formats. For example, in NR Release 15 (Rel-15) licensed band operations, slot formats may be indicated by at least one slot format indication (SFI), which may be included in group-common physical downlink control channel (GC-PDCCH) control signaling based on, for example, downlink control information (DCI) format 2_0.

According to the 3rd Generation Partnership Project (3GPP) technical specification (TS) 38.213, V15.3.0, section 11, DCI format 2_0 may indicate at least one SFI for one or more serving cells. Each SFI index in DCI format 2_0 may indicate a high-layer, preconfigured combination of single-slot formats. For example, under 3GPP TS 38.331, V15.3.0, the corresponding ASN.1 configuration structure may be similar to the format illustrated in FIG. 1. Under 3GPP, a network entity may configure up to 512 combinations per cell, with one combination indicating a slot format for up to 256 slots.

In addition, a slot format of a single slot may be configured as an 8-bit entry, such as shown in FIG. 2, where "D" indicates a downlink symbol, "U" indicates an uplink symbol, and "F" indicates a flexible symbol. Such a flexible symbol could indicate no transmitting and no receiving, indicate at least one downlink/uplink switching gap, indicate that the symbol is to be reserved, and/or facilitate dynamic traffic adaptation between downlink and uplink, according to a network entity scheduler decision.

SUMMARY

In general, example embodiments of the present disclosure provide solutions for transmitting/receiving downlink control signal. In some embodiments, the downlink control signal carries improved indication of slot format and/or indication of a structure of channel occupancy time (COT).

In a first aspect, there is provided a method. The method may be performed, e.g., by a network entity. The method includes transmitting at least one downlink control signal to a terminal device. The downlink control signal comprises a current slot format indicator and a further indicator. The current slot format indicator indicates a slot format combination. The further indicator comprises one or more of: an offset for indicating a start position of the slot format combination, an applicability indication indicating slots during which the current slot format indicator is valid, a next slot format indicator, and an ending indication indicating where channel occupancy time ends.

In a second aspect of the present disclosure, another method is proposed. The method may be performed by a terminal device, and includes receiving at least one downlink control signal from a network entity. The downlink control signal comprises a current slot format indicator and a further indicator. The current slot format indicator indicates a slot format combination. The further indicator comprises one or more of: an offset for indicating a start position of the slot format combination, an applicability indication indicating slots during which the current slot format indicator is valid, a next slot format indicator, and an ending indication indicating where channel occupancy time ends. The method may further comprise determining, based on the current slot format indicator and the further indicator, a first valid slot or a first slot where the current slot format indicator is configured to be applied, and at least one last valid slot format.

A third aspect of the present disclosure provides an apparatus. The apparatus can include at least one processor, and at least one memory including computer program code. The at least one memory and the computer program code are configured, with the at least one processor, to cause the apparatus to perform at least a method according to the first aspect, or any of its variants.

A fourth aspect of the present disclosure provides another apparatus. The apparatus can include at least one processor, and at least one memory including computer program code. The at least one memory and the computer program code are configured, with the at least one processor, to cause the apparatus to perform at least a method according to the second aspect, or any of its variants.

A fifth aspect of the present disclosure provides an apparatus. The apparatus includes means for performing the method according to the first aspect, or any of its variants.

A sixth aspect of the present disclosure provides an apparatus. The apparatus includes means for performing the method according to the second aspect, or any of its variants.

According to a seventh aspect or an eighth aspect of the present disclosure, a computer program product may encode instructions that, when executed by an apparatus, cause the apparatus to perform a process including a method according to the first aspect, the second aspect, or any of their variants.

According to a ninth aspect or a tenth aspect, a non-transitory computer-readable medium may encode instructions that, when executed by an apparatus, cause the apparatus to perform a process including a method according to the first aspect, the second aspect, or any of their variants.

According to an eleventh or a twelfth aspects, a computer program code may include instructions that, when executed by an apparatus, cause the apparatus to perform a process including a method according to the first aspect, the second aspect, or any of their variants.

According to a thirteenth aspect and a fourteenth aspect, an apparatus may include circuitry configured to cause an apparatus to perform a process including a method according to the first aspect, the second aspect, or any of their variants.

BRIEF DESCRIPTION OF THE DRAWINGS

For proper understanding of this disclosure, reference should be made to the accompanying drawings, wherein:

FIG. 1 illustrates an example of an ASN.1 configuration structure.

FIG. 2 illustrates an example of slot formats for a normal cyclic prefix.

FIG. 3 illustrates an example of a channel occupancy time structure indication in enhanced license assisted access.

FIG. 7 illustrates another example of certain embodiments.

DETAILED DESCRIPTION:

Partial glossary used in the disclosure are listed below.
3GPP 3rd Generation Partnership Project
4G 4th Generation Mobile Network
5G 5th Generation Mobile Network
BW Bandwidth
BWP Bandwidth part
CG Configured Grant
COT Channel Occupancy Time
DCI Downlink Control Information
DL Downlink
LAA Licensed Assisted Access
eLAA Enhanced Licensed Assisted Access
LTE Long Term Evolution
eNB LTE Base Station
GC-PDCCH Group-Common Physical Downlink Control Channel
gNB New Radio Base Station
HARQ Hybrid Automatic Repeat Request
IE Information Element
LBT Listen-Before-Talk
MCS Modulation and Coding Scheme
NDI New Data Indicator
NE Network Entity
NR-U New Radio Unlicensed
PDCCH Physical Downlink Control Channel
PDSCH Physical Downlink Shared Channel
PRB Physical Resource Block
PUSCH Physical Uplink Shared Channel
RIV Resource Indication Value
SFI Slot Format Indicator
UE User Equipment
UL Uplink Under LTE Rel-14, enhanced licensed assisted access (eLAA) describes control signalling associated with common PDCCH. For example, as shown in FIG. 3, two fields indicate the downlink structure, including subframe configuration for LAA, as well as the uplink subframe structure, including uplink configuration for LAA. The subframe configuration for LAA may indicate a 4-bit combination of the "current and next DL subframe format" in LTE as either a full downlink subframe or subframe with downlink pilot time slot (DwPTS). Similarly, UL configuration for LAA may indicate a 5-bit combination of an offset of a starting position of an UL portion counted from the current subframe to the length of the UL portion in subframes.

In NR Rel-15, DCI format 2_0 has been designed to enable flexible TDD, where the DCI format may cancel periodically configured signals. Additionally, the indicated slot format may be associated with the current and upcoming slots, and can be monitored periodically. However, DCI format 2_0 has not been optimized for NR-U purposes, where all transmissions are subject to certain regulations that impose limits, for example, a number of consecutively transmitted slots. Furthermore, it is possible to operate an NR licensed band scenario without DCI format 2_0. But for NR-U, DCI format 2_0 may be the default mode of operation, if not mandatory.

Figures 4, 5:
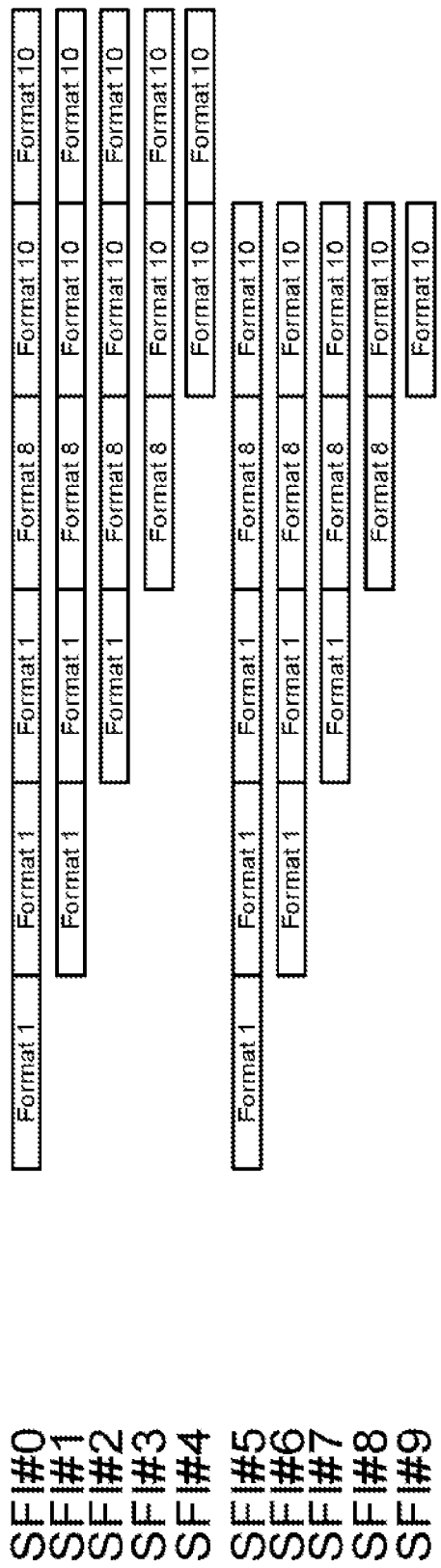
FIG. 4 illustrates an example of the need for multiple shortened versions of the same DL/UL pattern.
FIG. 5 illustrates an example of an indicated slot format indicator.

In NR-U, DCI format 2_0 may be monitored more often at the beginning of the channel occupancy time. If a network entity, such as a gNB, would transmit NR Rel-15 GC-PDCCH in every slot, the network entity may needlessly configure multiple versions of the same DL/UL structure or slot combination. In the example illustrated in FIG. 4, slot format indicators #0-#4 are configured for indicating different versions of a slot combination of formats 1, 1, 1, 8, 10 and 10 at consecutive slots. Correspondingly, slot format indicators #5-#9 illustrated in FIG. 4 are configured for indicating different versions of a slot combination of formats 1, 1, 1, 8, and 10 at consecutive slots. Thus, a user equipment would be indicated in the subsequent SFI at different slots with no shortening, as illustrated in FIG. 5.

Another disadvantage in previous techniques is that, while the transmission burst may have a limited set of potential DL/UL structures or slot format combinations, the timing of the transmission burst may vary due to contention on the channel access. NR SFI provides the slot format combination relative to the slot timing (slot number) of the cell where NR SFI has been received, such as absolute timing. Alternatively, in NR-U, the network entity may start its downlink burst in any slot, including from the middle of the slot, causing the timing of the slot format to shift over time. Thus, in order to support a variable timing of a transmission burst, the network entity would need to configure multiple versions of the same slot format combination to support different transmission burst starting times. This would result in a very large number of SFI configurations, wasting limited network resources and requiring excessive configuration overhead.

In NR-U, the network entity may support different ratios of DL/UL split, and may also change this split on the fly while indicating different versions of a bi-directional slot, or shortening the downlink and/or uplink portions of the channel occupancy time (COT) or transmission opportunity (TxOP). As an example, an NR-U cell may frequently serve only a few active user equipment in a transmission burst due to the small cell sizes associated with NR-U. Coupled with short user equipment processing times and multiple UL/DL switching points during the transmission burst or COT, the network entity may obtain HARQ feedback, and determine the need for further HARQ retransmissions during the transmission burst or COT. As a result, the preferred slot format combination, such as duration, for the ongoing transmission burst may be affected.

Certain embodiments described herein may help to avoid significant increases in configuration overhead and complexity associated with legacy R-15 DCI format 2_0. Certain embodiments are, therefore, directed to improvements in computer-related technology, specifically, conserving network resources and reducing power consumption of network entities and/or user equipment located within the network.

Furthermore, certain embodiments may keep semi-static RRC and dynamic overhead low while satisfying NRU COT structure needs. For example, a network entity may want to indicate a structure multiple times as some user equipment might not be aware of the start of the transmission burst due to interference, the NR-U COT starting times may vary over time, a network entity may shorten or prolong COT if there is no data to transmit or data transmission is required, and/or a network entity may indicate multiple switching points.

Figure 6:
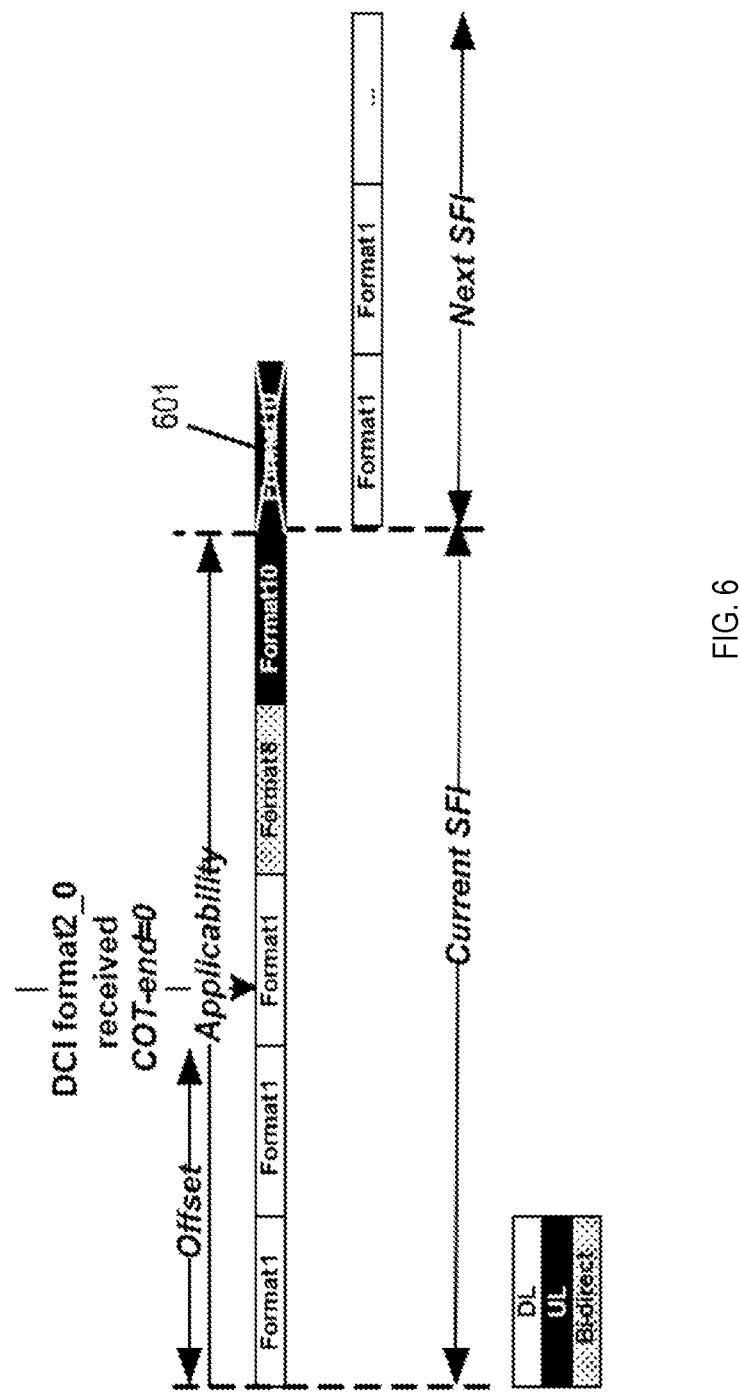
FIG. 6 illustrates an example of core aspects according to certain embodiments.

Certain embodiments described herein may introduce one or more additional fields to DCI format 2_0 to provide an efficient indication of COT structure. For example, the "current SFI" field may indicate the slot structure in the current slot and/or subsequent slots. Furthermore, an "offset" indicator may indicate an offset of SFI-start, such as the slot where the current SFI was first valid or the first slot where the current SFI was to be applied, relative to the slot where DCI format 2_0 was received, including the current slot, in order to provide signaling of shifted versions of pre-configured SFI combination. The "Applicability" indication indicates number of slots during which the current SFI is valid, which may be counted, for example, from the slot where the GD-PDCCH is received, or from where the current SFI started, as illustrated in FIG. 6. If the network entity has no data to transmit, the flexible shortening of the downlink and/or uplink portions of COT may be enabled by setting appropriate offset/shift and applicability/shortening. Furthermore, flexible concatenation of preconfigured SFIs may achieve different UL/DL patterns in the cases when multiple DL/UL switching points within a COT are used.

In some embodiments, COT may be similar to European Telecommunications Standards Institute (ETSI) European Standard, telecommunications series (EN) 301 893, V2.1.1, where COT consists of one or more transmissions of an initiating device, such as a network entity, and zero or more transmissions of one or more responding devices, such as user equipment. In certain embodiments, the duration of at least one COT may be limited.

Optionally, a "next SFI" indicator may enable flexible indication of at least one upcoming DL/UL cycle in case of, for example, multiple switching points or consecutive COTs. The "next SFI" indication may also take place after the current SFI ends, which may be determined based on the applicability of the current SFI.

In addition, an optional "COT-end" indicator may be associated with 1-bit and/or 1 signaling state of the next SFI, and may indicate that a network entity has determined where a COT ends so that the user equipment may stop monitoring PDCCH to save power. If indicated, the user equipment may not monitor the C-RNTI or other RNTIs in the slot or slots after the last slot, as indicated by the "applicability" indicator.

In an example shown in FIG. 7, a network entity may configure 3 SFI combinations, denoted as patterns 1-3. However, any number of patterns may be configured, for example, via RRC, and therefore, the 3 patterns illustrated in FIG. 7 are shown for illustration purposes. In the example of FIG. 7, the sizes of "current SFI" and "next SFI" fields may be 2 bits in length in DCI format 2_0. A network entity may be configured to achieve the desired patterns shown in FIGS. 4 and 7, and may indicate the indicator values shown at the bottom of the chart, where "p2" means pattern 2, and "p3" means pattern 3 corresponding to SFI slot format combinations. The "applicability" indicator may be indicated from the beginning of the indicated SFI slot combination. As an example, current SFI and next SFI may be 2+2 bits, and the offset and applicability indicators would be 3+3 bits. Thus, due of polar code, the minimum payload of the DCI format 2_0 would be 12 bits, while 2 bits would be padded on top or used for other signaling purposes.

Figure 8:
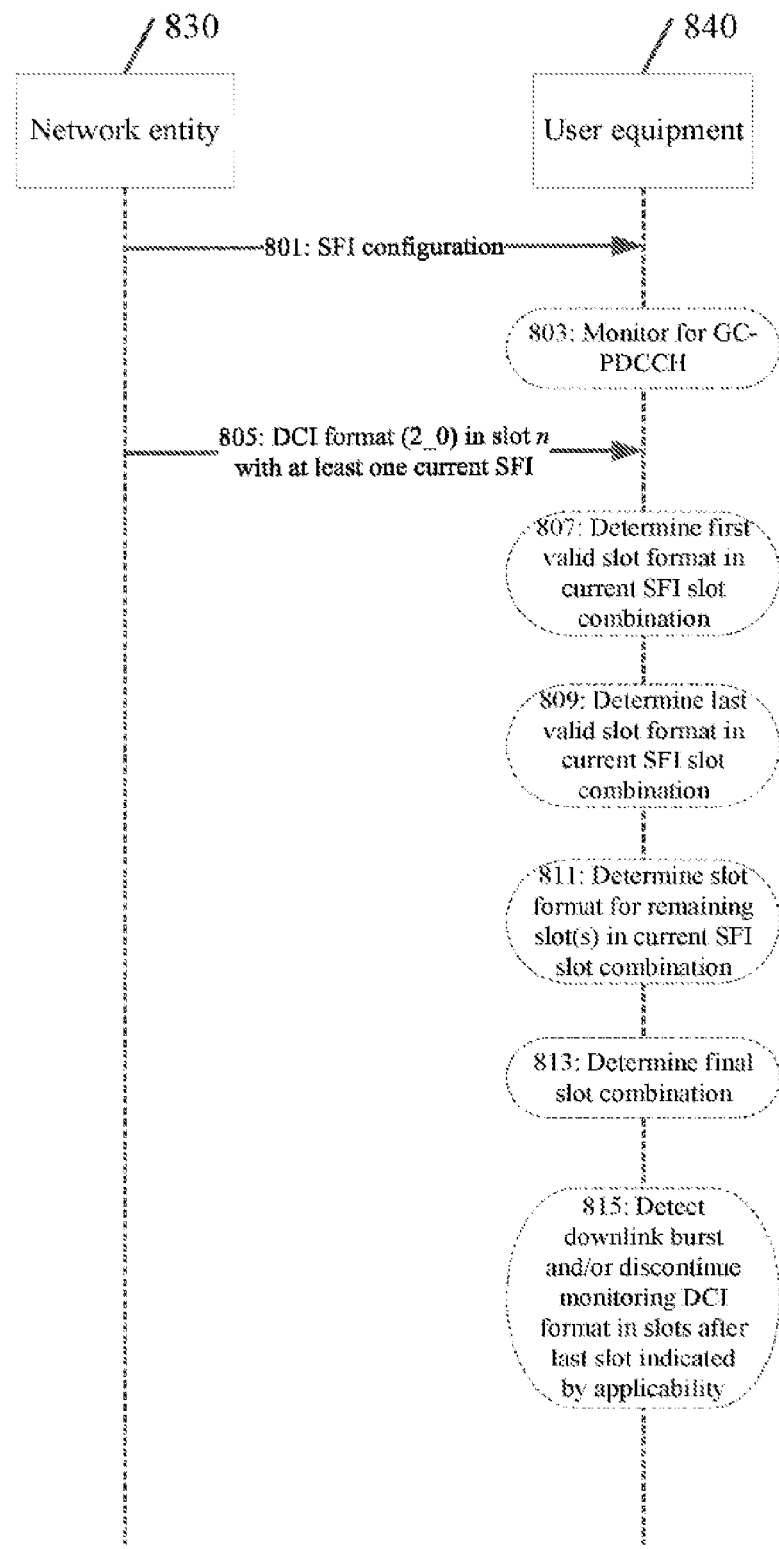
FIG. 8 illustrates an example of a signal flow diagram according to certain embodiments.

FIG. 8 illustrates an example of a signal flow diagram according to certain embodiments. A system may include one or more of at least one network entity 830, such as network entity 1210 shown in FIG. 12, and user equipment 840, such as user equipment 1220 shown in FIG. 12.

In step 801, network entity 830 may transmit at least one SFI configuration on at least one BWP to UE 840. The configuration for the initial downlink bandwidth part may be broadcast in MIB or SIB. In some embodiments, the at least one SFI configuration may include one or more of at least one RNTI associated with DCI format 2_0, at least one monitoring occasion associated with DCI format 2_0, at least one search-space parameter associated with DCI format 2_0, at least one DCI format 2_0 content for one or more serving cells including, for example, at least one preconfigured slot format combination. The DCI format 2_0 content may be associated with at least one information element (IE).

In step 803, UE 840 may monitor for at least one GC-PDCCH. In certain embodiments, the monitoring may be performed outside the channel occupancy time (COT) of network entity 830 by at least one predetermined periodicity and/or performed only upon at least one downlink burst detection. Additionally or alternatively, the monitoring may be performed in at least one partial slot of the COT of network entity 830 based upon at least one COT structure. Additionally or alternatively, the monitoring may be performed in at least one full slot of the COT of network entity 830 based upon at least one configuration.

In step 805, UE 840 may receive at least one DCI format from network entity 830, such as DCI format 2_0, in slot n with at least one of: current SFI $s_c$ indicating one or more of at least one slot format combination, at least one offset o, which may be associated with n, at least one applicability $\alpha$, at least one next SFI $s_n$, and at least one indication of COT-end. In some embodiments, the received at least one DCI format may comprise frequency domain aspect (active sub-bands of, for example, 20 MHz bandwidth) based on a bitmap or resource indication value (RIV) which may indicate which of the sub-bands of BWP are used by the network entity based on listen before talk (LBT) procedure; channel access-related information to denote which type of channel access user equipment should use when accessing channel for transmission on the indicated or scheduled UL resources; and/or information indicating the additional PDCCH monitoring occasions in the at least partial slot of the TxOP/COT.

In step 807, UE 840 may use the at least one offset o to determine at least one first valid slot format in the current SFI slot combination applicable to the slot n as $s_c(o)$. In some embodiments, the at least one offset o may be indicated from the slot n to the beginning of the current SFI. As an example, where the at least one offset o is negative, the validity of the indicated SFI starts only in the upcoming slots. Additionally or alternatively, the at least one offset o may be indicated from the beginning of the SFI slot combination to the slot n. As an example, where the at least one offset o is positive, the validating of the at least one indicated SFI slot configuration may only start in upcoming slots.

In step 809, UE 840 may determine at least one last valid slot format in the at least one current SFI slot combination. In some embodiments, the determination may be based upon the at least one applicability $\alpha$. In certain embodiments, the at least one applicability $\alpha$ may be indicated from the at least one slot n. In various embodiments, the at least one applicability α may indicate the first slot of the current SFI slot combination, such as illustrated in FIG. 7. In some embodiments, the at least one applicability α may be indicated as a complement from the at least one last slot of the current SFI.

In step 811, UE 840 may determine at least one slot format for the remaining slots other than the first and last slots corresponding to the current SFI.

In step 813, UE 840 may determine at least one final slot format combination by combining the shifted and shortened slot format combination $s_c$ (current SFI) together with $s_n$ (next SFI), if indicated. In some embodiments, UE 840 may override at least one slot format in the at least one indicated slot, such as slot 601 in FIG. 6, which may be irrespective of at least one slot format previously indicated for the slots.

In step 815, UE 840 may perform detection of at least one downlink burst and/or may discontinue monitoring of at least one DCI format associated with C-RNTI in the at least one slot after the last slot determined in step 809, such as if COT-end is indicated. In some embodiments, the COT-end indication may correspond with at least one reserved state of at least one next SFI.

Figure 9:
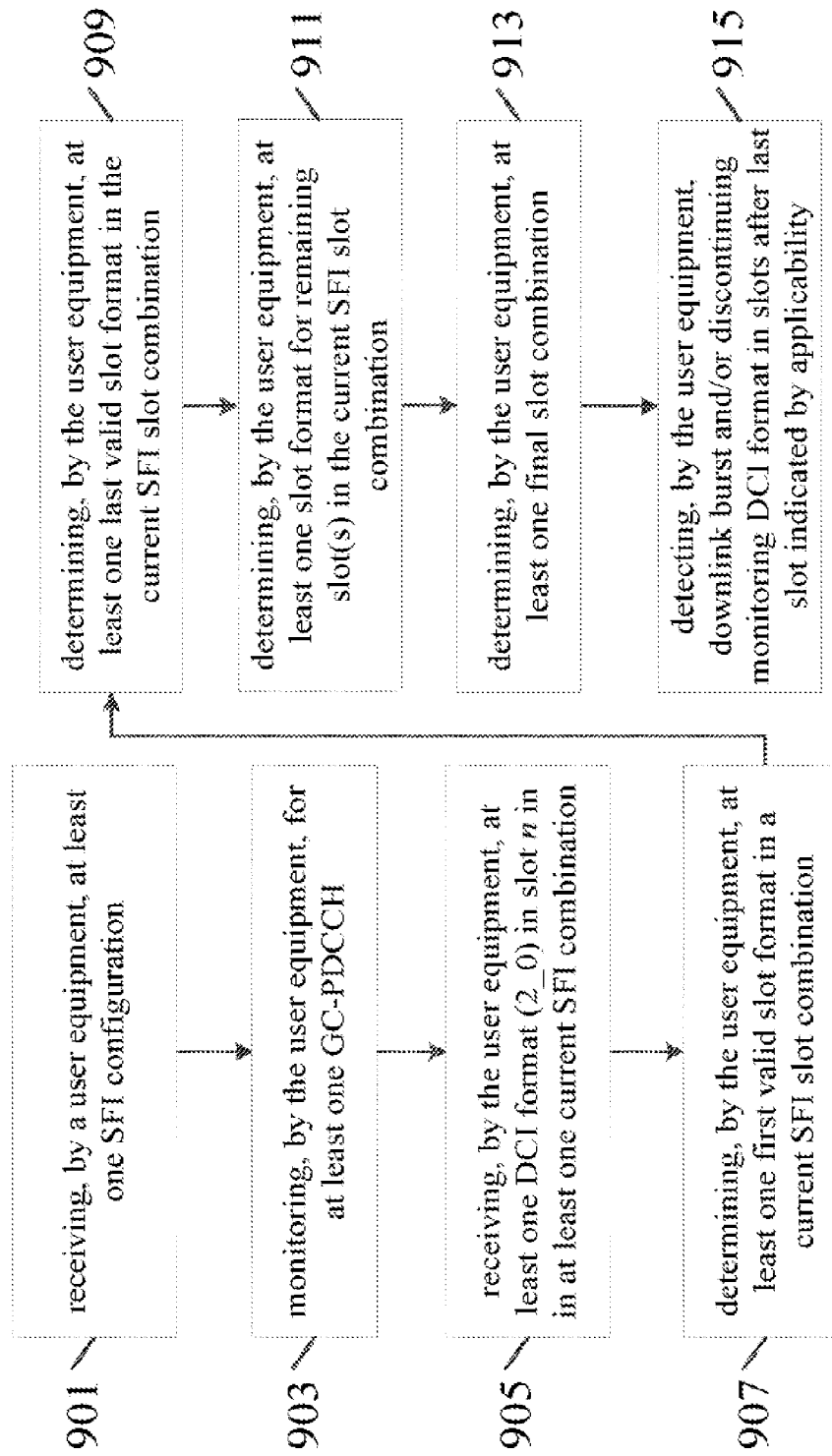
FIG. 9 illustrates an example of a method performed by a user equipment according to some embodiments.
Figure 12:
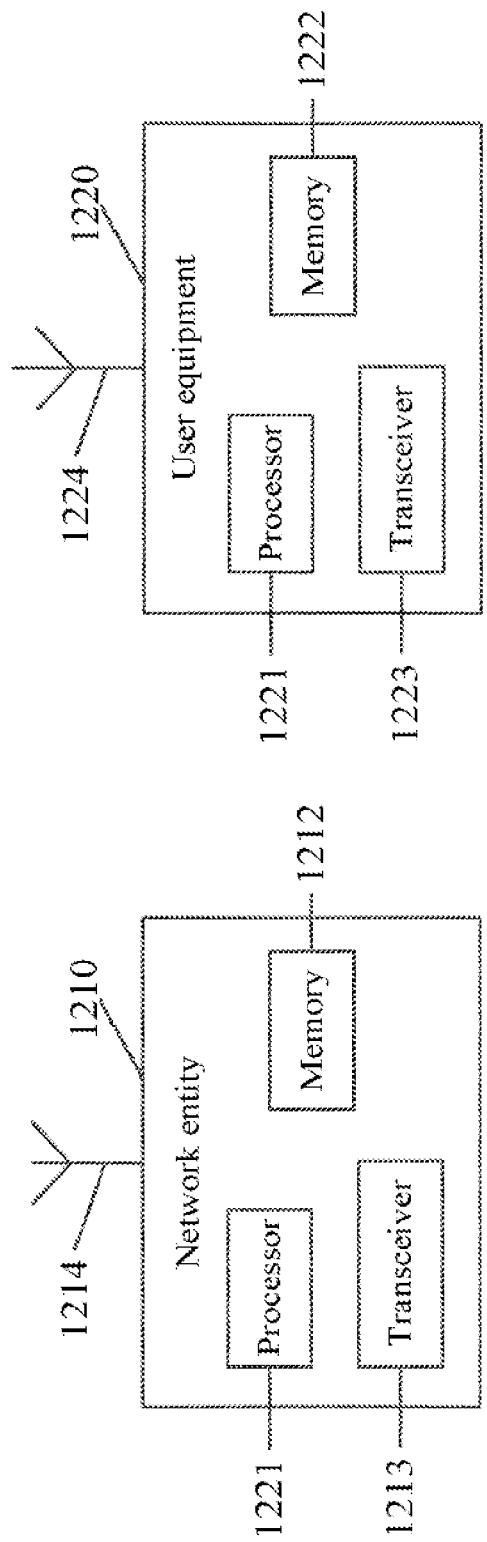
FIG. 12 illustrates an example of a system according to certain embodiments.

FIG. 9 illustrates an example of a method performed by a UE, such as UE 1220 in FIG. 12, according to some embodiments. In block 901, the user equipment may receive at least one SFI configuration on at least one BWP. In some embodiments, the at least one SFI configuration may include one or more of at least one RNTI associated with DCI format 2_0, at least one monitoring occasion associated with DCI format 2_0, at least one search-space parameter associated with DCI format 2_0, at least one DCI format 2_0 content for one or more serving cells including, for example, at least one preconfigured slot format combination. The DCI format 2_0 content may be associated with at least one IE.

In block 903, the user equipment may monitor for at least one GC-PDCCH. In certain embodiments, the monitoring may be performed outside the channel occupancy time (COT) of at least one network entity, such as network entity 1210 shown in FIG. 12, with at least one predetermined periodicity and/or performed only upon at least one downlink burst detection. Additionally or alternatively, the monitoring may be performed in at least one partial slot of the COT of the network entity based upon at least one COT structure. Additionally or alternatively, the monitoring may be performed in at least one full slot of the COT of the network entity based upon at least one configuration.

In block 905, the user equipment may receive at least one DCI format, such as format 2_0, in slot n with at least one of: current SFI $s_c$ indicating one or more of at least one slot format combination, at least one offset o, which may be associated with n, at least one applicability α, at least one next SFI $s_n$, and at least one indication of COT-end.

In block 907, the user equipment may use the at least one offset o to determine at least one first valid slot format in the current SFI slot combination applicable to the slot n as $s_c(o)$. In some embodiments, the at least one offset o may be indicated from the slot n to the beginning of the current SFI, and/or offset o may denote slot where current SFI would be or would have been first applied. As an example, where the at least one offset o is negative, the validity of the indicated SFI starts only in the upcoming slots. Additionally or alternatively, the at least one offset o may be indicated from the beginning of the SFI slot combination to the slot n. As an example, where the at least one offset o is positive, the validating of the at least one indicated SFI slot configuration may start only in upcoming slots.

In block 909, the user equipment may determine at least one last valid slot format in the at least one current SFI slot combination. In some embodiments, the determination may be based upon the at least one applicability α. In certain embodiments, the at least one applicability α may be indicated from the at least one slot n. In various embodiments, the at least one applicability α may indicate the first slot of the current SFI slot combination, such as illustrated in FIG. 7. In some embodiments, the at least one applicability α may be indicated as a complement from the at least one last slot of the current SFI.

In some embodiments, the user equipment may receive the at least one first valid slot or the first slot where the current SFI was to be applied and/or the at least one last valid slot in the current SFI jointly via a combination of the at least one offset o and/or the at least one applicability α.

In block 911, the user equipment may determine at least one slot format for the remaining slots other than the first and last slots corresponding to the current SFI.

In block 913, the user equipment may determine at least one final slot format combination by combining the shifted and shortened slot format combination $s_c$ (current SFI) together with $s_n$ (next SFI), if indicated. In some embodiments, the user equipment may override at least one slot format in the at least one indicated slot, which may be irrespective of at least one slot format previously indicated for the slots.

In block 915, the user equipment may perform detection of at least one downlink burst and/or may discontinue monitoring of at least one DCI format associated with C-RNTI in the at least one slot after the last slot indicated by applicability, such as if COT-end is indicated. In certain embodiments, the COT-end indication may correspond with at least one reserved state of at least one next SFI.

Figure 10:
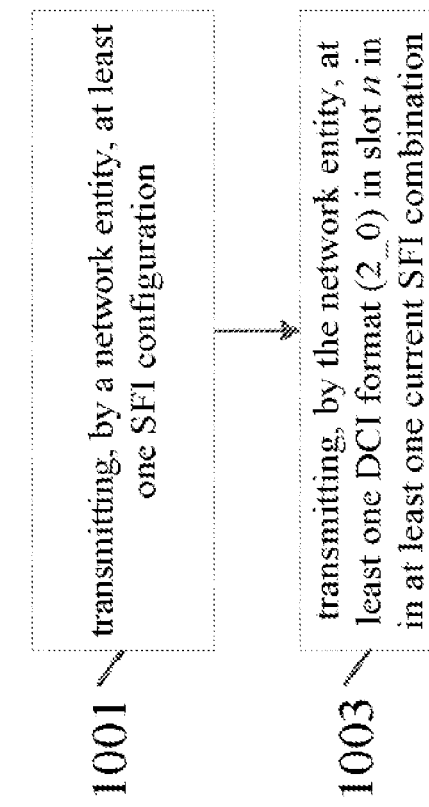
FIG. 10 illustrates an example of a method performed by a network entity according to some embodiments.

FIG. 10 illustrates an example of a method performed by a network entity, such as NE 1210 in FIG. 12, according to some embodiments. In block 1001, the network entity may transmit at least one SFI configuration on at least one BWP. In some embodiments, the at least one SFI configuration may include one or more of: at least one RNTI associated with DCI format 2_0, at least one monitoring occasion associated with DCI format 2_0, at least one search-space parameter associated with DCI format 2_0, and at least one DCI format 2_0 content for one or more serving cells including, for example, at least one preconfigured slot format combination. The DCI format 2_0 content may be associated with at least one IE.

In step 1003, the network entity may transmit at least one DCI format, such as format 2_0, in slot n with at least one of: current SFI $s_c$ indicating one or more of at least one slot format combination, at least one offset o, which may be associated with n, at least one applicability α, at least one next SFI $s_n$, and at least one indication of COT-end. In some embodiments, the transmitted at least one DCI format may comprise frequency domain aspect (active sub-bands of, for example, 20 MHz bandwidth) based on a bitmap or resource indication value (RIV) which may indicate which of the sub-bands of BWP are used by the network entity based on listen before talk (LBT) procedure; channel access-related information to denote which type of channel access user equipment should use when accessing channel for transmission on the indicated or scheduled UL resources; and/or information indicating the additional PDCCH monitoring occasions in the at least partial slot of the TxOP/COT.

The following is an example for determining the slot format combination via the proposed DCI format. In this example, the "offset" field in the DCI indicates an offset in a slot format sequence to be applied from the slot where the DCI is received. For example, the slot formats may be those defined in FIG. 2. If SFI#1 is predefined/configured to indicate a slot format sequence of 1/1/1/8/10/10, and if a slot format sequence of 1/1/1/8/10/1/8/10/10 is to be indicated to the UE, then the network entity can indicate SFI#1 in each slot, from slot 0 to slot 8, and with different offset and applicability values, as below:

Slot0: SFI#1, offset 0, applicability 5=>1
Slot1: SFI#1, offset 1, applicability 5=>1
Slot2: SFI#1, offset 2, applicability 5=>1
Slot3: SFI#1, offset 3, applicability 5=>8
Slot4: SFI#1, offset 4, applicability 5=>10
Slot5: SFI#1, offset 2, applicability 6=>1
Slot6: SFI#1, offset 3, applicability 6=>8
Slot7: SFI#1, offset 4, applicability 6=>10
Slot8: SFI#1, offset 5, applicability 6=>10

In this example, applicability 5 indicated from the slot where current SFI#1 is configured to be applied causes skipping of the last slot format 10 in the sequence. This also indicates the last valid slot in current SFI190 1. Offset 2 in slot 5 indicates the slot where current SFI#1 is configured to be applied, causing skipping of the first 1/1 in the sequence 1/1/1/8/10/10, such that indicated slot formats starting from slot 5 are /1/8/10.

Figure 11:
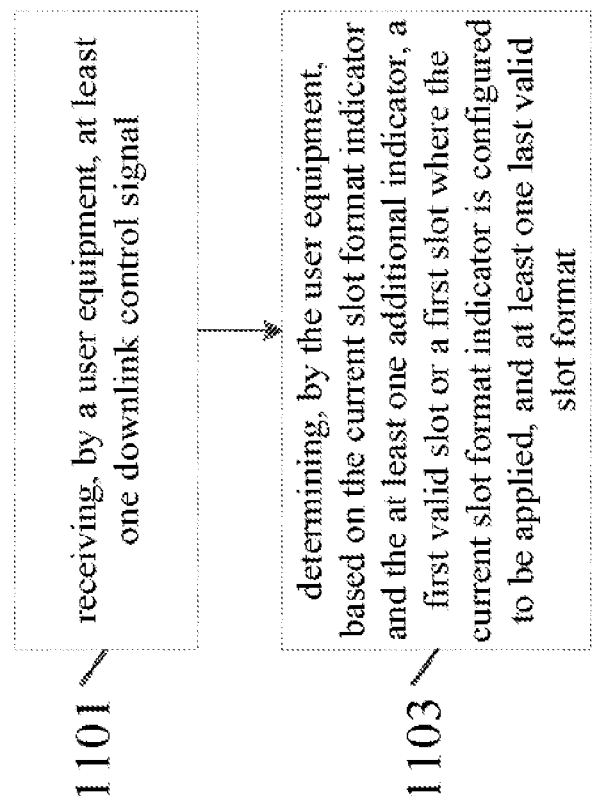
FIG. 11 illustrates an example of a method performed by a user equipment according to some embodiments.

FIG. 11 illustrates an example of a method performed by a UE, such as UE 1220 in FIG. 12, according to some embodiments. In block 1101, the user equipment may receive at least one downlink control signal. In some embodiments, the downlink control signal may further comprise at least one current slot format indicator indicating at least one slot format combination. The downlink control signal may further comprise at least one additional indicator that may comprise one or more of at least one offset, at least one applicability indication, at least one next slot format indicator, and at least one indication of at least one channel occupancy time ending. The at least one additional indicator may be received in at least one group-common physical downlink control channel. In block 1103, the user equipment may determine, based on the current slot format indicator and the at least one additional indicator, 1) a first valid slot or a first slot where the current slot format indicator is configured to be applied, and 2) at least one last valid slot format.

FIG. 12 illustrates an example of a system according to certain embodiments. In one embodiment, a system may include multiple devices, such as, for example, network entity 1210 and/or user equipment 1220.

Network entity 1210 may be one or more of: a base station, such as an evolved node B (eNB) or 5G or New Radio node B (gNB), a serving gateway, a server, and/or any other access node or combination thereof.

User equipment 1220 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Network entity 1210 may also be similar to user equipment 1220. Furthermore, network entity 1210 and/or user equipment 1220 may be one or more of a citizens broadband radio service device (CBSD).

In addition, in some embodiments, functionality of the network entity 1210 and/or UE 1220 may be implemented by other network nodes, such as a wireless relay node. For example, functionalities of UE 1220 may be performed by a mobile termination (MT) component of the IAB node.

One or more of these devices may include at least one processor, respectively indicated as 1211 and 1221. Processors 1211 and 1221 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 1212 and 1222. The memory may be fixed or removable. The memory may include computer program instructions or computer code contained therein. Memories 1212 and 1222 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 1211 and 1221 and memories 1212 and 1222 or a subset thereof, may be configured to provide means corresponding to the various blocks of FIGS. 1-11. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 12, transceivers 1213 and 1223 may be provided, and one or more devices may also include at least one antenna, respectively illustrated as 1214 and 1224. The device may have many antennas, such as an array of antennas configured for multiple input multiple output (MIMO) communications, or multiple antennas for multiple radio access technologies. Other configurations of these devices, for example, may be provided. Transceivers 1213 and 1223 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-11). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-11. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present disclosure. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the disclosure. In order to determine the metes and bounds of the present disclosure, therefore, reference should be made to the appended claims.

According to a first aspect of the present disclosure, a method includes transmitting, by a network entity, at least one downlink control signal to a user equipment. The downlink control signal comprises at least one current slot format indicator indicating at least one slot format combination. The downlink control signal further comprises one or more of at least one offset, at least one applicability indication, at least one next slot format indicator, and at least one indication of at least one channel occupancy time ending.

In some embodiments, the method may further comprise transmitting, by the network entity, at least one SFI configuration. Alternatively, in some embodiments, the SFI configuration may be indicated to the terminal device implicitly or predefined, and as a result, the transmitting of the SFI configuration may be avoided.

In some embodiments, the downlink control signal comprises format 2_0.

In some embodiments, the method further includes transmitting, by the network entity, at least one indication jointly indicating 1) a first valid slot or a first slot where the current slot format indicator is configured to be applied, and 2) at least one last valid slot format, by a combination of the at least one offset and/or the at least one applicability indicator.

In some embodiments, the at least one SFI configuration may include one or more of: at least one RNTI associated with DCI format 2_0, at least one monitoring occasion associated with DCI format 2_0, at least one search-space parameter associated with DCI format 2_0, and at least one DCI format 2_0 content for one or more serving cells including, for example, at least one preconfigured slot format combination.

In some embodiments, the next slot format indicator (SFI) indicates at least one upcoming downlink/uplink cycle part of the same or different channel occupancy time acquired by the network entity.

According to a second aspect of the present disclosure, a method includes receiving, by a user equipment, at least one downlink control signal. The downlink control signal further comprises at least one current slot format indicator indicating at least one slot format combination. The downlink control signal further comprises at least one additional indicator that may comprise one or more of at least one offset, at least one applicability indication, at least one next slot format indicator, and at least one indication of at least one channel occupancy time ending. The at least one additional indicator is received in at least one group-common physical downlink control channel. The method further comprises determining, by the user equipment, based on the current slot format indicator and the at least one additional indicator 1) a first valid slot or a first slot where the current slot format indicator is configured to be applied, and 2) at least one last valid slot format.

In some embodiments, the downlink control signal comprises format 2_0.

In some embodiments, the method further comprises detecting, by the user equipment, a downlink burst, and/or discontinuing monitoring DCI format in slots after the last slot indicated by at least one indication.

In some embodiments, the at least one indication is associated with a channel occupancy time ending and/or reserved state of at least one next slot format indicator.

In some embodiments, the method further comprises receiving or obtaining, by the user equipment, at least one SFI configuration.

In some embodiments, the method further comprises monitoring, by the user equipment, for at least one GC-PDCCH.

In some embodiments, the method further comprises receiving, by the user equipment, at least one DCI format (2_0) in slot n in at least one current SFI combination.

In some embodiments, the method may further include determining, by the user equipment, at least one slot format for remaining slot(s) in the current SFI slot combination.

In some embodiments, the method may further include determining, by the user equipment, at least one final slot format combination.

In some embodiments, the method may further comprise determining slot formats after a last valid slot of current SFI based on next SFI included in the DL control signal.

In some embodiments, the method may further include overriding, by the user equipment, at least one slot format in the at least one previously indicated slot.

In some embodiments, the method may further include performing, by the user equipment, downlink-to-uplink switching based on the final slot format combination.

According to a third aspect and a fourth aspect of the present disclosure, an apparatus can include at least one processor and at least one memory and computer program code. The at least one memory and the computer program code can be configured to, with the at least one processor, cause the apparatus at least to perform a method according to the first aspect, the second aspect, or any of their variants.

According to a fifth aspect and a sixth aspect of the present disclosure, an apparatus can include means for performing the method according to the first aspect, the second aspect, or any of their variants.

According to a seventh aspect and an eighth aspect of the present disclosure, a computer program product may encode instructions that, when executed by an apparatus, cause the apparatus to perform a process including a method according to the first aspect, the second aspect, or any of their variants.

According to a ninth aspect and a tenth aspect, a non-transitory computer-readable medium may encode instructions that, when executed by an apparatus, cause the apparatus to perform a process including a method according to the first aspect, the second aspect, or any of their variants.

According to an eleventh and a twelfth aspects, a computer program code may include instructions that, when executed by an apparatus, cause the apparatus to perform a method according to the first aspect, the second aspect, or any of their variants.

According to a thirteenth aspect and a fourteenth aspect, an apparatus may include circuitry configured to cause an apparatus to perform a process including a method according to the first aspect, the second aspect, or any of their variants.

The invention claimed is:

1. An apparatus, comprising:
   at least one processor, and
   at least one memory including computer program code;
   the at least one memory and the computer program code are configured, with the at least one processor, to cause the apparatus to:
   receive at least one downlink control signal from a network device, the downlink control signal comprising a current slot format indicator and a further indicator, the current slot format indicator indicating at least one slot format combination and the further indicator comprising an ending indication indicating where channel occupancy time ends;
   determine, based on the current slot format indicator and the further indicator, a first valid slot and an end of the channel occupancy time, and
   discontinue monitoring downlink control information from the network device in a slot after the last slot indicated by the ending indication.

2. The apparatus of claim 1, wherein the end of the channel occupancy time is different from a last slot indicated by the current slot format indicator.

3. The apparatus of claim 1, wherein the further indicator is received in a group-common physical downlink control channel.

4. The apparatus of claim 1, wherein the downlink control signal comprises a downlink control information format 2_0.

5. The apparatus of claim 1, wherein the at least one memory and the computer program code are further configured, with the at least one processor, to cause the apparatus to:
   detect a downlink burst.

6. The apparatus of claim 1, wherein the ending indication is associated with a channel occupancy time ending indicator and/or a reserved state of a next slot format indicator.

7. The apparatus of claim 1, wherein the at least one memory and the computer program code are further configured, with the at least one processor, to cause the apparatus to:
   obtain at least one slot format indication (SFI) configuration.

8. The apparatus of claim 7, wherein the at least one SFI configuration indicates one or more of: a RNTI associated with the downlink control signal, a monitoring occasion associated with the downlink control signal, a search-space parameter associated with the downlink control signal, or content of the downlink control signal for one or more serving cells.

9. An apparatus, comprising:
   at least one processor, and
   at least one memory including computer program code;
   the at least one memory and the computer program code are configured, with the at least one processor, to cause the apparatus to:
   transmit at least one downlink control signal to a terminal device, the downlink control signal comprising a current slot format indicator and a further indicator, the current slot format indicator indicate at least one slot format combination and the further indicator comprising an ending indication indicating where channel occupancy time ends,
   wherein a combination of a plurality of indications included in the further indicator indicates jointly: 1) a first valid slot or a first slot where the current slot format indicator is configured to be applied, and 2) at least one last valid slot format.

10. The apparatus of claim 9, wherein the downlink control signal comprises a downlink control information format 2_0.

11. The apparatus of claim 9, wherein the at least one memory and the computer program code are further configured, with the at least one processor, to cause the apparatus to:
    transmit at least one slot format indication (SFI) configuration to the terminal device.

12. The apparatus of claim 11, wherein the at least one SFI configuration indicates one or more of: a RNTI associated with the downlink control signal, a monitoring occasion associated with the downlink control signal, a search-space parameter associated with the downlink control signal, or content of the downlink control signal for one or more serving cells.

13. A method, comprising:
    receiving, by a terminal device, at least one downlink control signal from a network device, the downlink control signal comprising a current slot format indicator and a further indicator, the current slot format indicator indicating at least one slot format combination and the further indicator comprising an ending indication indicating where channel occupancy time ends;
    determining, based on the current slot format indicator and the further indicator, a first valid slot and an end of the channel occupancy time; and
    discontinuing monitoring downlink control information from the network device in a slot after the last slot indicated by the ending indication.

14. The method of claim 13, wherein the end of the channel occupancy time is different from the last slot indicated by the current slot format indicator.

15. The method of claim 13, wherein the further indicator is received in a group-common physical downlink control channel.

16. The method of claim 13, wherein the downlink control signal comprises a downlink control information format 2_0.

17. The method of claim 13, further comprising:
    detecting, by the terminal device, a downlink burst.

18. The method of claim 13, wherein the ending indication is associated with a channel occupancy time ending indicator and/or a reserved state of a next slot format indicator.

19. The method of claim 13, further comprising obtaining, by the terminal device, at least one slot format indication configuration.

20. A method, comprising:
transmitting, by a network device, at least one downlink control signal to a terminal device, the downlink control signal comprising a current slot format indicator and a further indicator, the current slot format indicator indicate at least one slot format combination and the further indicator comprising an ending indication indicating where channel occupancy time ends,
wherein a combination of a plurality of indications included in the further indicator indicates jointly: 1) a first valid slot or a first slot where the current slot format indicator is configured to be applied, and 2) at least one last valid slot format.

* * * * *